United States Patent [19]

Street, Jr.

[11] Patent Number: 4,635,766
[45] Date of Patent: Jan. 13, 1987

[54] AUTOMOTIVE SUSPENSION STRUT WITH INCREASED STROKE
[75] Inventor: Thomas R. Street, Jr., Livonia, Mich.
[73] Assignee: Ford Motor Company, Dearborn, Mich.
[21] Appl. No.: 691,260
[22] Filed: Jan. 14, 1985
[51] Int. Cl.$^4$ ............................................. F16F 9/36
[52] U.S. Cl. ............................... 188/317; 188/322.16; 188/284
[58] Field of Search ................. 188/322.17, 322.18, 188/322.16, 315, 317, 284, 282; 267/8 R; 280/668

[56] References Cited

U.S. PATENT DOCUMENTS

| 1,150,925 | 8/1915 | Benner | 188/284 |
| 2,149,040 | 2/1939 | Binder et al. | 188/317 |
| 2,320,314 | 5/1943 | Trask | 267/8 R |
| 2,379,750 | 7/1945 | Rossman | 188/284 |
| 2,575,389 | 11/1951 | Lornitzo | 188/286 |
| 2,660,449 | 11/1953 | MacPherson | 280/665 |
| 2,696,278 | 12/1954 | Bonn | 188/317 |
| 3,024,874 | 3/1962 | DeKoning et al. | 188/317 |
| 3,036,669 | 5/1962 | Schultze | 188/282 |
| 3,256,960 | 6/1966 | Casimir | 188/317 |
| 4,331,224 | 5/1982 | Sano | 280/668 |
| 4,433,759 | 2/1984 | Ichinose | 188/282 |
| 4,508,201 | 4/1985 | Axthammer et al. | 188/322.18 |

FOREIGN PATENT DOCUMENTS

| 3123575 | 12/1982 | Fed. Rep. of Germany . |
| 2073367 | 10/1981 | United Kingdom ........... 188/322.18 |

Primary Examiner—Duane A. Reger
Assistant Examiner—Alvin Oberley
Attorney, Agent, or Firm—Jerome R. Drouillard; Roger L. May

[57] ABSTRACT

A suspension strut for an automotive vehicle comprises a working cylinder, piston rod, a pressure piston carried within a working cylinder upon the piston rod, a first rod bearing located at one end of the working cylinder and a second piston rod bearing extending telescopically from piston rod and slidably engaged with the working cylinder.

10 Claims, 2 Drawing Figures

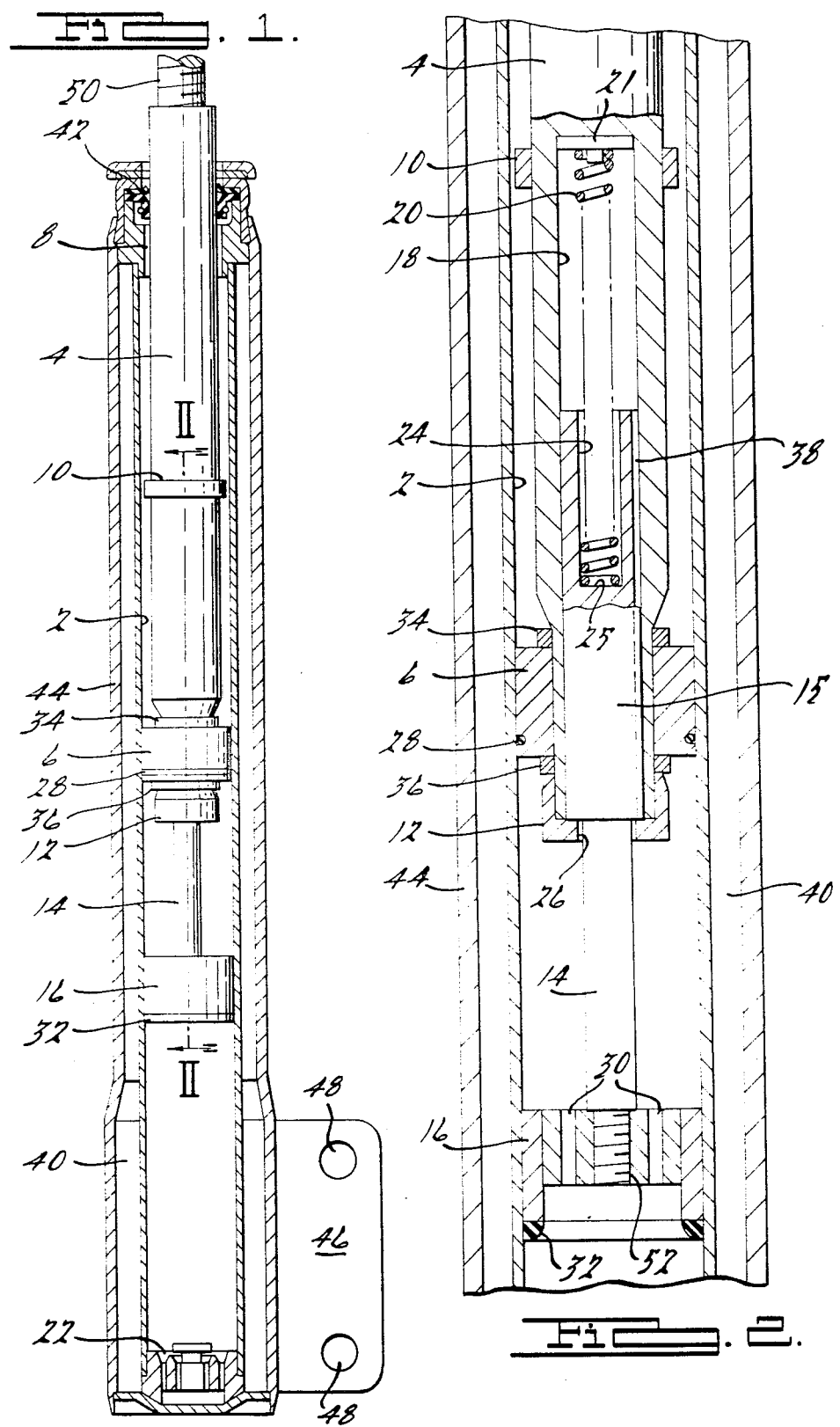

AUTOMOTIVE SUSPENSION STRUT WITH INCREASED STROKE

BACKGROUND OF THE INVENTION

1. Field of the Invention

This invention relates to a suspension strut having an increased stroke.

2. Description of the Prior Art

Telescoping struts have been used in automotive suspensions for many years. An example of such use is disclosed in U.S. Pat. No. 2,660,449, which defines the classic MacPherson strut configuration in which the lower end of the strut is rigidly attached to the wheel carrier and the upper end of the strut is pivotally attached to the body or chassis. Another type of strut suspension, the so called modified MacPherson configuration, differs from the original MacPherson design principally in that the suspension spring bears upon a lower control arm rather than being concentrically located about the strut itself. With either of these designs, the strut is subjected to beam stress caused by the weight of the vehicle acting upwardly through the spindle. This beam stress causes friction within the strut, acting at the upper bearing where the piston rod passes into the interior of the strut, and also acting upon the strut piston. The presence of this friction can cause the piston rod and piston to cock within the strut cylinder bore; avoidance of such action requires that the distance between the upper bearing and the piston be not less than a predetermined minimum value when the suspension system is in full rebound condition—i.e. when the wheel has traveled vertically the maximum distance away from vehicle's chassis or body in a downward direction.

The distance between the upper rod bearing and the piston in the full rebound position is termed "bearing span". It is the purpose of present invention to maintain bearing span distance while allowing a reduction in the overall length of the strut. This is accomplished by means of a telescoping plunger and lower bearing arrangement mounted to the strut piston rod.

U.S. Pat. No. 1,150,925 discloses a dash pot for an adding machine having a telescoping plunger carried within the piston. U.S. Pat. No. 2,379,750 discloses a hydraulic shock absorber having a shut-off valve attached to a plunger telescopingly mounted into the shock absorber piston rod. U.S. Pat. No. 2,575,389 discloses a single unit hydraulic check for a garment pressing machine having part of its valving mechanism projecting upwardly from the foot of the check unit into a receiving bore within the check's piston. Finally, U.S. Pat. No. 3,036,669 discloses a hydraulic shock absorber with compression cut-off, including an auxiliary piston which cooperates with a secondary cylinder to produce additional resistance to movement of the shock absorber at its final stages of compression.

SUMMARY OF THE INVENTION

The suspension strut of the present invention includes a working cylinder, a piston rod, pressure piston carried within the working cylinder upon the piston rod, a first piston rod bearing located at one end of the working cylinder and a second piston rod bearing extending telescopingly from the piston rod and slidably engaged with the working cylinder. The second piston rod bearing is secured to a plunger carried within an axial bore formed in the piston rod. This bearing includes a cylindrical body having an outside diameter sized for slidable fit within the working cylinder and one or more passages for conducting fluid through the bearing. The plunger to which the second bearing is attached is resiliently extended from the piston rod; a compression spring may be used for this purpose.

A suspension strut constructed in accordance with the present invention will possess the bearing span needed for proper operation of the strut while at the same time allowing decreased length of the strut. This is advantageous inasmuch as such decreased length is important for certain automotive designs where, for example, it is desirable to lower a vehicle's hood line for aerodynamic and fuel economy purposes.

BRIEF DESCRIPTION OF THE DRAWINGS

FIG. 1 is a cut-away view of a portion of the automotive strut of the present invention.

FIG. 2 is a sectional view of the strut of FIG. 1 taken along line II—II of FIG. 1.

DETAILED DESCRIPTION OF THE PREFERRED EMBODIMENT

As shown in the figures, the automotive strut of the present invention includes piston rod 4 which is supported within working cylinder 2. Upper piston rod bearing 8 supports piston rod 4 at the upper part of working cylinder 2 and lower piston rod bearing 16 supports lowest part of the piston rod.

Pressure piston 6 is mounted to piston rod 4 between upper and lower retainers 34 and 36. The pressure piston and retainers are clamped to piston rod 4 by plunger retaining nut 12. Piston rod 4 enters working cylinder 2 through seal 42 carried at the upper end of working cylinder 2. Base valve 22 is provided at the lower end of working cylinder 2. The base valve is adapted to resist flow of hydraulic fluid from working cylinder 2 into reservoir chamber 40 and to allow a substantially free flow of fluid from reservoir chamber 40 into working cylinder 2. The upper portion of the piston rod is provided with a threaded section 50 which facilitates connection with the body or chassis of a vehicle. Lower mounting bracket 46, which has mounting holes 48, is adapted for connection to a wheel carrier.

As shown with particularity in FIG. 2, lower piston rod bearing 16 is fixed upon plunger rod 14 by threaded section 52. Plunger rod upper segment 15 is carried within axial bore 18 formed within piston rod 4. Bore 24, within plunger rod segment 15, houses a portion of compression spring 20, which is mounted between piston rod bulkhead 21 and plunger rod bulkhead 25. The plunger is held in engagement with piston rod 4 by plunger retaining nut 12.

Pressure piston 6 may be valved and ported in any desired manner and functions to control fluid flow within the strut in the conventional manner. A sealing ring 28 is provided between pressure piston 6 and working cylinder 1. The outside diameter of pressure piston 6 is sized so that only sealing ring 28 will come in contact with the wall of working cylinder 2 during normal operating conditions.

Operation of a strut incorporating the present invention will now be described in detail. When the piston rod is fully extended from the working cylinder, rebound stop 10 will abut upper piston rod bearing 8 and the plunger assembly will be fully extended from piston rod 4. This is the position of the plunger assembly shown in the Figures. The bearing span is therefore the distance between rebound stop 10 and lower piston rod bearing 16. Because the plunger is fully extended from piston rod 4 the chamber between bulkheads 21 and 25 will be filled with the hydraulic fluid utilized within the strut. At the strut is compressed, piston rod 4 will be supported by the upper and lower bearings 8 and 16 respectively. As the strut reaches the position of full compression, bumper 32 fixed to the lower end of bearing 16 will contact base valve 22 and fluid will begin to be expelled from the space between bulkheads 21 and 25. Fluid will be displaced as the upper segment 15 of the plunger moves in a direction toward bulkhead 21.

One or more axially running grooves 38 is provided in the outer surface of plunger segment 15 to allow fluid to move from the space between bulkheads 21 and 25 and along groove 38 and then through annular passage 26 between plunger rod lower segment 14 and plunger retaining nut 12 into the space below pressure piston 6. In this manner the expulsion of fluid from the bulkhead space will not impede movement of the plunger into the piston rod.

When the strut has been fully compressed and is then extended, the upper plunger segment will begin to move in a direction from bulkhead 21 toward bulkhead 25 and this movement will be accompanied by the reintroduction of fluid within the space between the two bulkheads. Plunger oil grooves 38 are intended to be of sufficient size so as to prevent the imposition of any meaningful restriction upon the movement of the plunger in this direction as well. Further, ports 30 are provided within bearing 16 so as to prevent bearing 16 from exerting any meaningful force upon the fluid within the strut. In sum, the suspension strut of the present invention provides operating characteristics which are substantially similar to those of conventional components, but with reduced length of the strut.

Alternatively, the present suspension strut arrangement may be used to achieve greater strut stroke length while maintaining the overall length of the strut assembly constant.

It is understood that my invention is not limited to the specific embodiment shown and that various deviations may be made therefrom without departing from the spirit and scope of the appended claims.

I claim:

1. A suspension strut for a motor vehicle comprising:
    a working cylinder;
    a piston rod having an upper portion extending from said working cylinder and a lower portion including a lower end within said working cylinder;
    a pressure piston fixed upon the lower portion of said piston rod and carried within said working cylinder;
    a first piston rod bearing, located at one end of said working cylinder, through which the upper portion of said piston rod extends;
    a second piston rod bearing mounted upon slidable means extending from said lower end of said piston rod; and
    means for resiliently extending said slidable means and said second piston rod bearing from said lower end of said piston rod in a direction away from said upper portion of said piston rod so that said second piston rod bearing will be allowed to move slidably from a first position abutting said lower end of said piston rod to a second position in which said second piston rod bearing separated from said lower end of said piston rod, whereby the effective bearing span of said strut will be increased by the distance said second piston rod bearing moves relative to said lower end of said piston rod.

2. The suspension strut of claim 15 wherein said slidable means comprises a plunger carried within an axial bore formed in said piston rod and emerging from said lower end of said piston rod.

3. The suspension strut of claim 2 wherein said second bearing comprises:
    a cylindrical body having an outside diameter sized for a slidable fit within said working cylinder;
    one or more passages for conducting fluid through said bearing; and
    means for securing said bearing to said plunger.

4. The suspension strut of claim 2 wherein said means for resiliently extending said plunger from said piston rod comprises a compression spring interposed between said plunger and the end of said axial bore formed in said piston rod.

5. The suspension strut of claim 2 wherein said plunger has one or more axially running grooves formed on its outer surface.

6. The suspension strut of claim 1 wherein said pressure piston includes means for controlling fluid flow through said piston as said piston moves through said working cylinder.

7. A suspension strut for a motor vehicle comprising:
    a working cylinder;
    means for attaching the lower end of said working cylinder to a wheel carrier;
    a piston rod bearing mounted to the upper end of said working cylinder;
    a piston rod comprising:
        a first end including means for securing said piston rod to the chassis of said automotive vehicle;
        a second end including plunger means for telescopically mounting a movable bearing to said second end, said plunger means comprising a spring-biased plunger reciprocably carried within a bore formed in the second end of said piston rod, said plunger being biased so as to cause said plunger to extend downwardly from said piston rod; and
        a movable bearing mounted to said plunger means; and
    a pressure piston mounted upon said piston rod above said movable bearing.

8. The suspension strut of claim 7 wherein said pressure piston includes means for controlling fluid flow through said piston as said piston moves through said working cylinder.

9. The suspension strut of claim 7 wherein said movable bearing comprises:
    a cylindrical body having an outside diameter sized for slidable fit within said working cylinder;
    one or more passages for conducting fluid through said bearing; and
    means for securing said bearing to said plunger means.

10. A suspension strut for an automotive vehicle comprising:
    a working cylinder having an upper end open to permit passage of a piston rod and a closed lower end;
    means for attaching the lower end of said working cylinder to a wheel carrier;

a piston rod bearing mounted to the upper end of said working cylinder; and a pressure piston secured to a piston rod with said piston rod comprising:
- a first end including means for securing said piston rod to the chassis of said automotive vehicle;
- a second end including spring biased plunger means for telescopically mounting a movable bearing to said second end with said plunger means having a lower end below said piston rod; and
- a movable bearing mounted to the lower end of said plunger means, said movable bearing being telescopically displaceable relative to said piston rod such that as said strut is compressed said movable bearing will contact the lower end of said working cylinder before said strut is fully compressed, thereby causing said movable bearing and said plunger means to move relative to said second end of said piston rod from a first position, existing when said strut is partially compressed, wherein said bearing is separated from said second end of said piston rod, to a second position, existing when said strut is fully compressed, wherein said plunger means is housed within said piston rod and said movable bearing abuts said second end of said piston rod.

* * * * *